United States Patent [19]

Syms et al.

[11] Patent Number: 4,746,082
[45] Date of Patent: May 24, 1988

[54] AIRCRAFT AND A SYSTEM INCLUDING AIRCRAFT BORNE APPARATUS

[75] Inventors: Philip W. Syms, Bournemouth; Douglas R. Taylor, Kent, both of England

[73] Assignees: Flight Refuelling Ltd.; GEC Avionics Ltd., both of England

[21] Appl. No.: 829,291

[22] Filed: Feb. 13, 1986

[51] Int. Cl.⁴ .............................................. B64C 1/36
[52] U.S. Cl. .............................. 244/137.4; 244/118.2; 343/705; 343/717
[58] Field of Search ................. 244/93, 118.2, 118.1, 244/137 A, 190, 17.11; 343/705, 717; 354/65, 70, 74

[56] References Cited

U.S. PATENT DOCUMENTS

| 2,745,098 | 5/1956 | Cady | 343/705 |
| 3,485,151 | 12/1969 | Taylor | 244/137 A |
| 3,523,660 | 8/1970 | Attebery et al. | 244/17.11 |
| 3,917,199 | 11/1975 | Dewitt | 354/70 |

FOREIGN PATENT DOCUMENTS

3030375 3/1982 Fed. Rep. of Germany ...... 244/190

Primary Examiner—Joseph F. Peters, Jr.
Assistant Examiner—Rodney Corl
Attorney, Agent, or Firm—Darby & Darby

[57] ABSTRACT

A fixed wing aircraft comprises two major components, namely an airframe and a payload carrier which are articulated. The airframe is equipped with all the essentials for independent flight. The attitude of the payload carrier can be controlled independently of the attitude of the airframe.

12 Claims, 6 Drawing Sheets

AIRCRAFT AND A SYSTEM INCLUDING AIRCRAFT BORNE APPARATUS

DESCRIPTION

This invention relates to an aircraft and to a system including aircraft borne apparatus which, in operation, is in signal communication with the ground.

Usually aircraft payloads are carried in suitable compartments formed in the airframe of the aircraft. Sometimes such payloads are packed or mounted in removable containers or pallets which, in turn are stowed in corresponding cavities in the airframe. Either way the payloads or their containers are fixed to the airframe during flight so that they follow movement of the airframe during all in-flight manoeuvres. This can lead to difficulties. For example, if the payload comprises an airborne part of a communication system which includes ground based equipment, the airborne and ground based equipment being in direct communication with one another, e.g. by electrical and/or optical signals transmitted through the space between transmitting and receiving means located at a respective one of the aircraft and a ground station, the signal path between the transmitting and receiving means can become masked from time to time by part of the aircraft as the aircraft executes certain free flight manoeuvres, such as when it turns. Security of communication can be achieved by use of narrow-beam polarised links. Manoeuvring of the aircraft would normally interrupt such polarised links. Taking an aerial surveillance system as another example, it can be difficult to avoid the visual display having an apparently mobile horizon because the viewing means move with the airplane.

If certain airborne apparatus, for example surveillance apparatus, is mounted in a helicopter, advantages in operation of airborne sensors incorporated in the apparatus, and in signal communication with a location on the ground would be derived from the ability of the helicopter to remain stable on its vertical axis. However a helicopter suffers from the disadvantages:

(1) High fuel consumption resulting in short range and duration;
(2) Low transit speed;
(3) High vibration levels resulting from development of high engine power and transmission of this power to rotors essential to sustain flight, and the oscillations and vibrations produced by the rotors themselves; and
(4) High cost of purchase and maintenance relative to fixed wing aircraft.

In comparison with a helicopter, a fixed wing aircraft capable of carrying the same payload mass, has relatively long endurance, less moving mechanical parts to produce vibration, and, at the low speeds appropriate to gathering imagery of the earth's surface, is able to sustain flight at very low engine power, hence at very low vibration levels.

Advantages would therefore derive from an aircraft which possesses the vertical axis stability of a helicopter while possessing the advantages of the fixed wing aircraft noted above.

An object of this invention is to confer upon a fixed wing aircraft the advantages of operation of certain types of apparatus possessed by helicopters as noted above.

According to one aspect of this invention there is provided an aircraft comprising an airframe including wings, power plant, and control means and systems required for independent flight, and having a payload carrier supported from the airframe, outside the airframe from which it is spaced, by support means which allow angular movement, at least in roll, of the carrier relative to the airframe.

Preferably stabilisation means are provided whereby the attitude of the carrier is maintained substantially constant relative to the horizontal at least in roll, regardless of the attitude of the airframe, at least within a certain range of movement of the airframe relative to the carrier. The stabilisation means may comprise a mechanical drive arrangement operable to effect controlled rotation of the carrier about its fore and aft axis through its centre of gravity. The mechanical drive arrangement may comprise a servomotor carried by the airframe and a transmission by which the servomotor output is transmitted to the carrier to effect controlled rotation of the carrier. Operation of the servomotor may be controlled by control means responsive to signals from an automatic pilot of the aircraft which may be dependent upon the rate of roll of the aircraft and the attitude of the airframe at any one instant. A feedback device responsive to the condition of the servomotor at any one instant may be incorporated in the mechanical drive arrangement.

The carrier may be fitted detachably to the airframe and may be part of a detachable assembly including the support means. Such a detachable assembly may be provided with a locking mechanism operable, when the assembly is detached from an airframe, to lock the carrier against angular movement relative to the remainder of the assembly.

According to another aspect of this invention there is provided a fixed wing aircraft comprising two major components which are articulated, one of the major components comprising an airframe including wings, power plant, and control means and systems required for independent flight, the other component being a payload carrier which is so articulated in relation to the airframe that its attitude can be controlled independently of the attitude of the airframe.

According to another aspect of this invention in a system including aircraft borne apparatus which, in operation, is in signal communication with the ground through free space, and which has transmitting and/or receiving means on or in open communication with an external surface of structure on which it is mounted, said apparatus being mounted within a payload carrier which is articulated to an airframe of a fixed wing aircraft by support means which allow angular movement, at least in roll, of the carrier relative to the airframe, the airframe including wings, power plant, control systems, etc. essential for independent flight, there being stabilisation means provided whereby the attitude of the carrier is maintained substantially constant relative to the horizontal, at least in roll, regardless of the attitude of the airframe, at least within a certain range of movement of the airframe relative to the carrier.

Incorporation of the present invention within an aircraft enables a payload carried by the aircraft to be maintained substantially horizontal during turning movements executed by the aircraft. Where the payload comprises apparatus including data link antennae the correct aspect of the antennae from the functional viewpoint can be maintained during various manoeuvres of the aircraft. Where the apparatus comprises surveillance apparatus, the invention enables 'horizon-up' imagery to be maintained on the visual display unit.

Two forms of aircraft in which this invention is embodied are described now with reference to the accompanying drawings, of which:-

Figure 1:
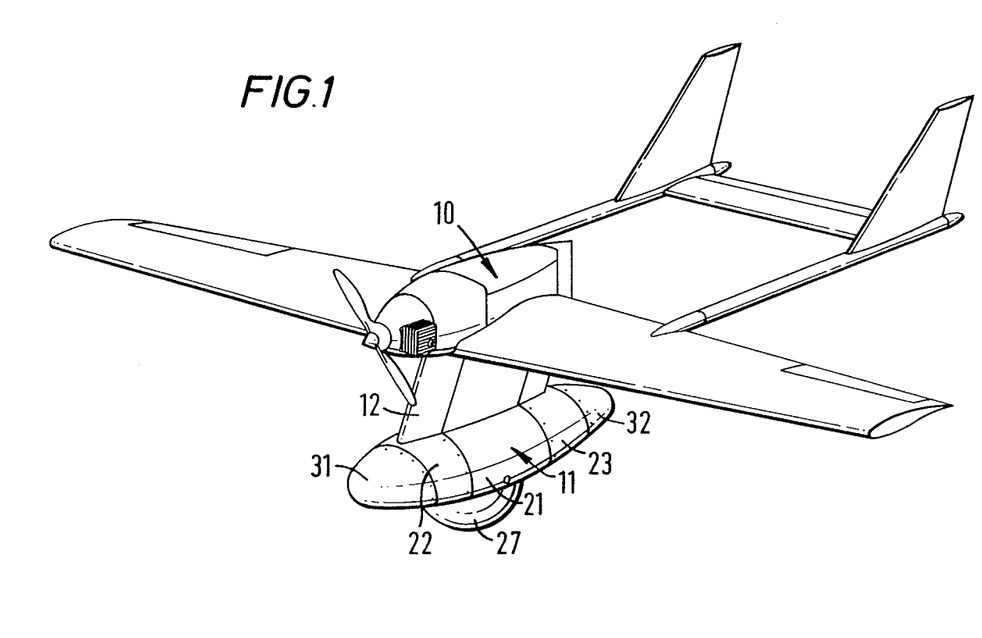
FIG. 1 is a view in perspective of a tractor propeller driven fixed wing aircraft in which this invention is embodied.

The aircraft shown in FIG. 1 comprises two major components, namely an airframe 10 and a payload carrier 11, which are articulated.

The airframe 10 comprises a central fuselage section with a nose section at its front and a pair of wings extending laterally from it, a twin boom tail section which projects rearwardly from the wings, and a pylon 12 which depends from the central fuselage section. All components and equipment essential to flight of the aircraft as a conventional fixed wing aircraft, including a power plant operable to drive the propeller and flight supporting services such as a fuel system including fuel tanks, a flight control system and a power plant control system, are incorporated in the airframe 10.

The payload carrier 11 is articulated to the bottom of the pylon 12 and comprises a generally cigar-shaped pod which projects beyond the pylon 12 in the fore and aft directions and which is mounted symmetrically relative to the airframe 10 with its longitudinal axis substantially parallel to the aircraft centreline of the airframe 10. The payload carrier 11 accommodates surveillance apparatus operable to gather imagery of the surface of the earth whilst the aircraft is in flight and two signal-link antennae operable to be in signal communication with a location on the ground.

The payload carrier 11 is a major component of the aircraft in that its volumetric dimensions are a substantial proportion of the equivalent dimensions of the overall aircraft.

Figure 2:
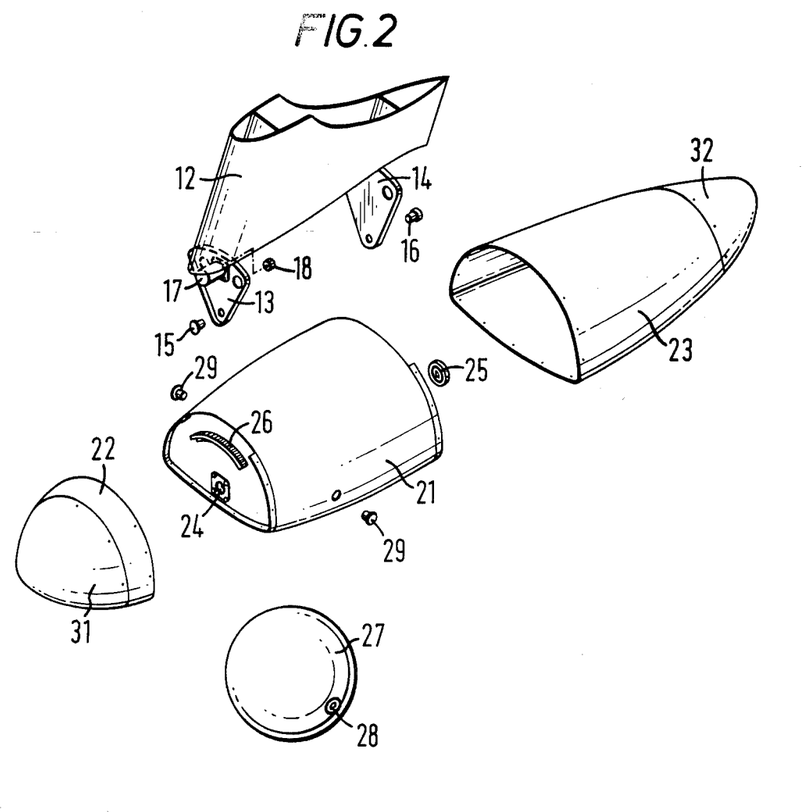
FIG. 2 is an exploded view in perspective of part of the aircraft shown in FIG. 1.

FIG. 2 shows that the pylon 12 carries two spade fittings 13 and 14 at its bottom, the spade fittings 13 and 14 depending from the pylon 12 and being spaced from one another in the direction of the aircraft centreline. Each spade fitting carries a respective one of a pair of coaxial roll bearing spigots 15 and 16. The forward spade fitting 13 has a stabilisation trim motor 17 mounted on it. The trim motor 17, which is adapted to operate in response to output signals from an attitude gyro incorporated in an automatic pilot carried in the airframe 10, has an output shaft which extends toward the rear spade fitting 14 in a direction substantially parallel to the aircraft centreline and which carries a spur gear 18.

The cigar-shaped pod is formed in three sections, a centre section 21, a front section 22 and a rear section 23. The centre section 21 extends between the spade fittings 13 and 14 from which it is suspended by engagement of each roll bearing spigot 15, 16 in a respective roll bearing 24, 25 which is mounted centrally respectively at the front and rear of the centre section 21. The spur gear 18 meshes with a rack quadrant 26 fixed to the front of the centre section 21 concentrically with the axis of the roll bearing 24. The front section 22 is fitted to the front of the centre section 21 and the rear section 23 is fitted to the rear of the centre section 21, each in such a way as to form a respective arcuate slot at the top of the pod through which the respective spade fitting 13, 14 passes and which allows for angular movement of the pod relative to the spade fitting 13 and 14.

A spherical surveillance sensor 27 is mounted within the centre section 21 by engagement in each of a diametrically opposed pair of gimbals 28 in the sensor 27 of a respective pitch bearing spigot 29, the spigots 29 being mounted opposite one another in the sides of the centre section 21. Approximately half the spherical sensor 27 projects from the underside of the centre section 21. Means (not shown) are provided for stabilising the sensor 27 in pitch relative to the centre section 21.

The front section 22 carries one of the signal-link antennae which is covered by a forward radome 31. The other signal-link antenna is carried by the rear section 23 and is covered by an aft radome 32. Hence the payload carrier 11 is supported below the airframe 10 for angular movement about its longitudinal axis through its centre of gravity which is on the axis of the roll spigots 15 and 16.

The roll stabilisation trim motor 17 is actuated in operation by signals from the attitude gyro of the automatic pilot in the airframe 10, those signals being dependent upon the aircraft roll rate and the attitude of the airframe 10 at any one instant. The motor 17 acts through a transmission comprising the interengaged spur gear 18 and rack quadrant 26 to drive the payload carrier 11 for angular movement about the axis of the roll spigots 15 and 16. The theoretical stabilising power requirement of the motor 17, neglecting mechanical friction and aerodynamic loading upon the carrier 11, is zero because the centre of gravity of the carrier 11 is on its axis of rotation.

The control means which actuate the motor 17 comprise stabilisation means by which the roll attitude of the payload carrier 11 can be maintained substantially constant relative to the horizontal 41 (see FIG. 3) within the range of possible movement of the airframe 10 relative to the payload carrier 11 that is allowed for by the circumferential length of the arcuate slots formed in the upper surface of the pod at either end of its centre section 21. A range of relative movement of up to 80° is thought likely to be appropriate.

Figure 3:
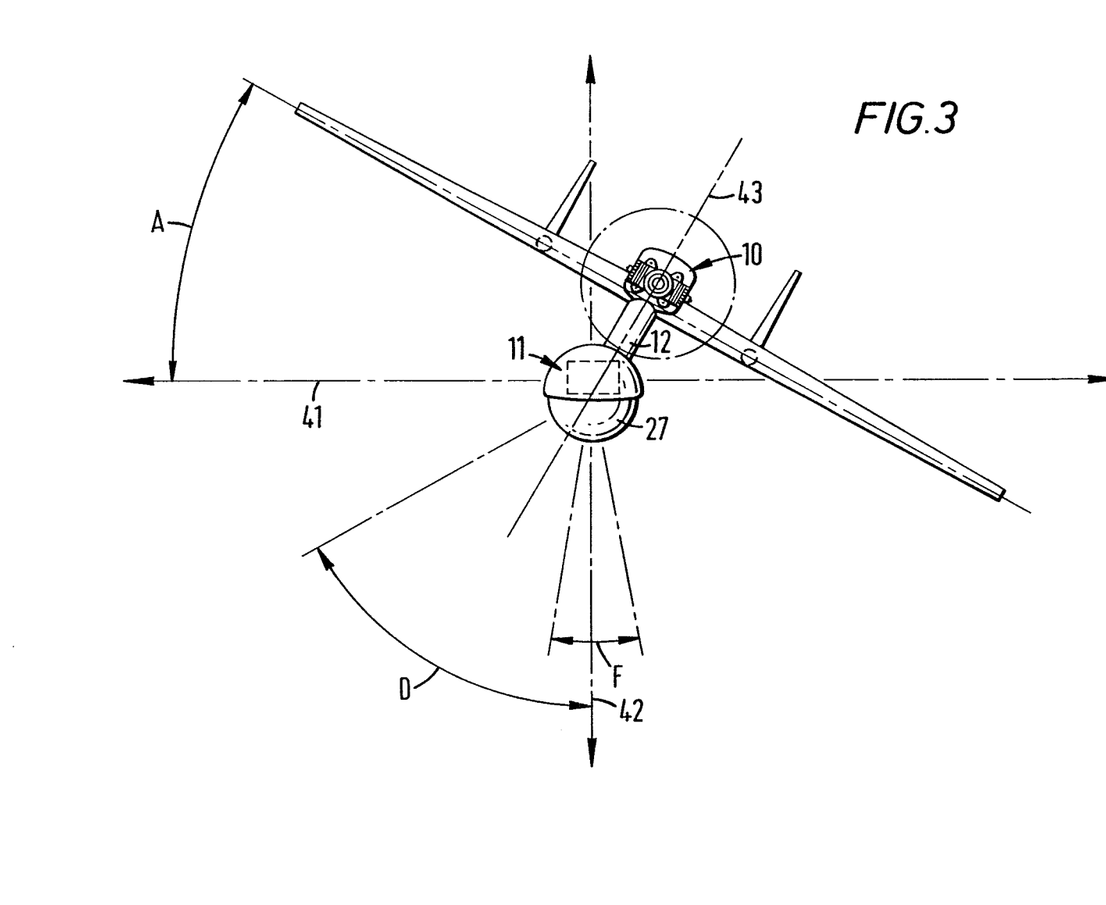
FIG. 3 is a front elevation of the aircraft shown in FIG. 1 in a banked attitude in flight.

FIG. 3 shows how the payload carrier 11 has been moved relative to the airframe 10 so as to maintain its attitude relative to the horizontal whilst the airframe 10 is banked during turning such that its wings make an angle of bank A with the horizontal 41. Hence the axis 42 of the field of view of the surveillance sensor 27 and the field of view F of the sensor 27 are not altered by change in attitude of the airframe 10 relative to the horizontal. The angle D in FIG. 3 depicts the scanning arc, relative to the airframe 10 of the surveillance sensor 27.

Figure 4:
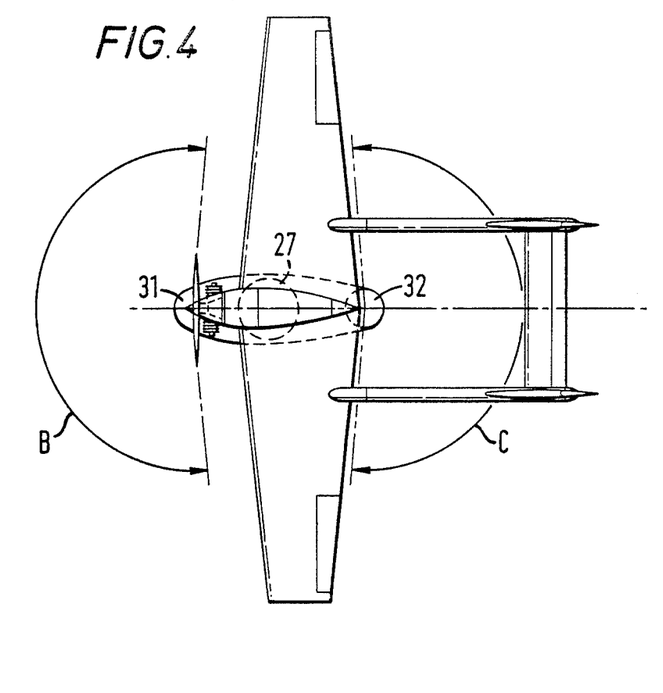
FIG. 4 is a plan view of the aircraft shown in FIG. 1.

FIG. 4 shows that, as a consequence of the positioning of the signal-link antennae at the front and rear of the pod that comprises the payload carrier 11, they are positioned forwards of and rearwards of, as well as below, the central fuselage section of the airframe 10 so that, when employing the Cassegrain aerial technique, they can provide 360° azimuth coverage (see angles B and C in FIG. 4) without obstruction of the signal-link by the flight manoeuvring of the airframe 10.

Figure 5:
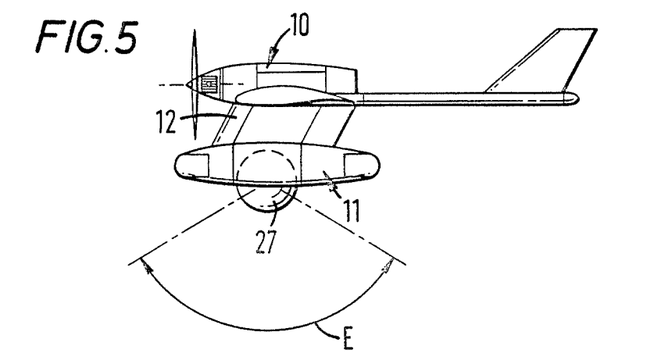
FIG. 5 is a side elevation of the aircraft shown in FIG. 1.

FIG. 5 shows the scanning cone E of the surveillance sensor 27.

Thus the viewing axis of the surveillance sensor 27 and the datum axis of the signal-link antennae are unaffected by the manoeuvring of the aircraft.

The surveillance sensor 27 may be steerable in azimuth by remote control. The signal-link antennae may be stabilised in pitch.

The aircraft may be a remotely piloted vehicle.

Figure 6:
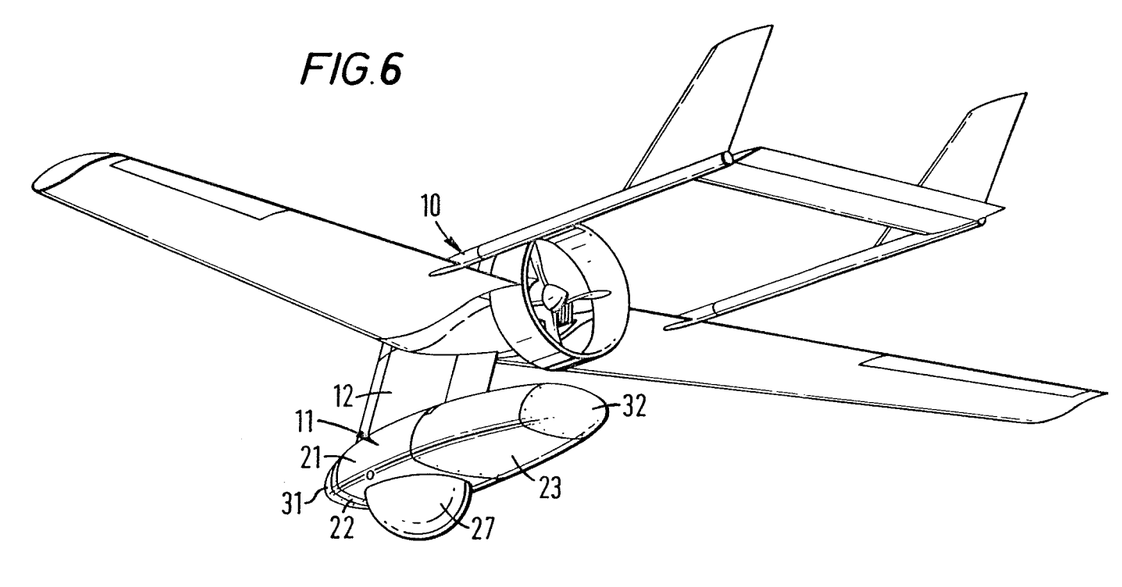
FIG. 6 is a view in perspective of a pusher propeller driven fixed wing aircraft in which this invention is embodied.
Figure 7:
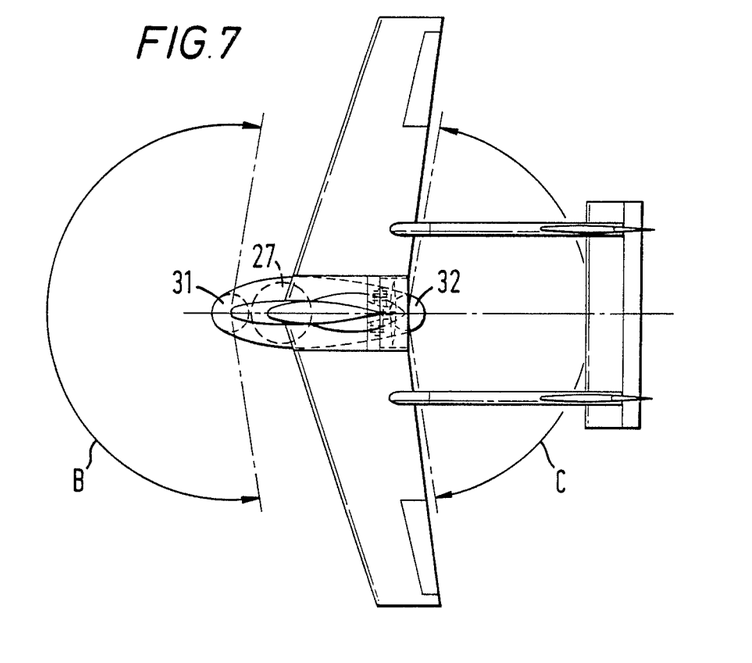
FIG. 7 is a plan view of the aircraft shown in FIG. 6.
Figure 8:
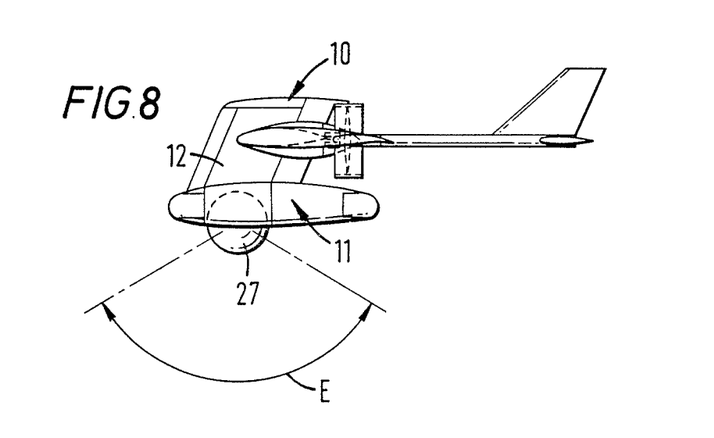
FIG. 8 is a side elevation of the aircraft shown in FIG. 6.

FIGS. 6, 7 and 8 are similar to FIGS. 1, 4 and 5 and illustrate an aircraft comprising a payload carrier similar to the payload carrier of the aircraft shown in FIGS. 1 to 5, articulated to an airframe which differs from the airframe of the aircraft shown in FIGS. 1 to 5 by incorporating a pusher propeller rather than the tractor driven propeller.

Various other forms of support means and various other forms of stabilisation means for supporting the payload carrier 11 below the airframe 10 and maintaining its attitude in roll substantially constant are forseen.

An alternative form of mechanical drive arrangement by which the servomotor drives the carrier for rotation may comprise a first radial arm fixed to structure of the pod at its longitudinal axis and hinged to a linkage at a location which is spaced from that axis. The linkage extends through a slot in the outer surface of the pod and into the interior of the airframe 10 through a suitable aperture therein. The part of the linkage within the airframe is hinged to an end of a second radial arm.

The spur gear 18 meshes with a gear train and the output member of the gear train carries the second arm. Hence the motor 17 drives the second arm for angular movement and thus drives the pod for angular movement about its longitudinal axis.

A rotary potentiometer, which is operatively associated with one of the gears of the gear train, provides a feedback signal for the control means, that feedback signal being indicative of the position of a rotor of the motor 17, and hence of the second arm, at any one instant.

The spade fittings 14 and 15, or struts upon which the pod is journaled for angular movement relative to the airframe 10 may be detachably mounted within the aircraft fuselage. The detachable assembly including the space fittings or struts and the pod may be provided with a locking mechanism which comprises a linear actuator which acts through a two-link linkage to raise or lower a hammer-headed locking lever which is pivotally mounted about its end remote from its head. The hammer head of the lever has a projecting portion which cooperates with a corresponding aperture in the outer surface of the pod. When the detachable structure including the pod and the spade fittings or support struts is detached from the airframe 10, the locking mechanism is in the condition wherein the projecting portion of the hammer head projects into its corresponding aperture. The linear actuator is contracted automatically when the detachable assembly is fitted to the airframe, so that the projecting portion of the hammer head is withdrawn from the corresponding aperture in the outer skin of the pod such that the pod is free for angular movement relative to the locking lever and thus relative to the aircraft structure.

We claim:

1. An aircraft comprising a first airframe portion including wings, power plant, and control means and systems required for independent flight, and another portion which is a payload carrier and which is supported from said first airframe portion, outside said first airframe portion from which it is spaced, by support means which allow angular movement, at least in roll, of said payload carrier portion relative to said first airframe portion whereby the attitude of said payload carrier portion can be controlled independently of the attitude of said first airframe portion, each said portion having an external surface which is a respective part of the external surface of the aircraft that is exposed to the atmosphere when the aircraft is in flight.

2. An aircraft according to claim 1, wherein stabilization means are provided whereby the attitude of said payload carrier portion is maintained substantially constant relative to the horizontal at least in roll, regardless of the attitude of said first airframe portion, at least within a certain range of movement of said first airframe portion relative to said payload carrier portion.

3. An aircraft according to claim 2, wherein the stabilization means comprises a mechanical drive arrangement operable to effect controlled rotation of said payload carrier portion about its fore and aft axis through its center of gravity.

4. An aircraft according to claim 3, wherein the mechanical drive arrangement comprises a servomotor carried by said first airframe portion and a transmission by which the servomotor output is transmitted to said payload carrier portion to effect controlled rotation of said payload carrier portion.

5. An aircraft according to claim 4, including control means operable in response to signals from an automatic pilot of the aircraft to control operation of the servomotor, the signals being dependent upon the rate of roll of said first airframe portion and the attitude of said first airframe portion at any one instant.

6. An aircraft according to claim 4, including a feedback device responsive to the condition of the servomotor at any one instant and incorporated in the mechanical drive arrangement.

7. An aircraft according to claim 1, wherein said payload carrier portion is fitted detachably to said first airframe portion and is part of a detachable assembly including the support means.

8. An aircraft according to claim 7, wherein the detachable assembly is provided with a locking mechanism operable, when the assembly is detached from said first airframe portion, to lock said payload carrier portion against angular movement relative to the remainder of the assembly.

9. A fixed wing aircraft comprising two major components which are articulated, one of the major components comprising an airframe portion including the wings, power plant, and control means and systems required for independent flight, the other component being a payload carrier portion which is outside said airframe portion, the aircraft having means for articulating the payload carrier portion in relation to said airframe portion so that its attitude can be controlled independently of the attitude of said airframe portion, each said major component having an external surface which is a respective part of the external surface of the aircraft that is exposed to the atmosphere when the aircraft is in flight.

10. A system including aircraft borne apparatus which, in operation, is in signal communication with the ground through free space, and which has transmitting and/or receiving means on or in open communication with an external surface of structure on which it is mounted, said apparatus being mounted within a portion of a fixed wing aircraft which is articulated to an airframe portion of the fixed wing aircraft by support means which allow angular movement, at least in roll, of the first mentioned portion relative to said airframe portion, said airframe portion including the wings, power plant, control means and systems essential for independent flight, stabilization means being provided so that the attitude of said first mentioned portion is maintained substantially constant relative to the horizontal, at least in roll, regardless of the attitude of said airframe portion, at least within a certain range of movement of said airframe portion relative to said first mentioned portion, each said portion having an external surface which is a respective part of the external surface of the aircraft that is exposed to the atmosphere when the aircraft is in flight.

11. An aircraft comprising two major components which are articulated one outside the other, each said major component having an external surface which is a respective part of the external surface of the aircraft that is exposed to the atmosphere when the aircraft is in flight, one of the major components comprising an airframe portion including wings, power plant and control means and systems required for independent flight, the other component being a payload carrier portion which is outside said airframe portion, the aircraft having means for articulating the payload carrier in relation to said airframe portion so that its attitude can be controlled independently of the attitude of said airframe portion and including stabilization means operable to maintain an axis of the payload carrier portion substantially vertical in flight.

12. An aircraft according to claim 11, wherein said articulation means provides that relative angular movement between said payload carrier and airframe portions is about the center of gravity of said payload carrier portion.

* * * * *